April 27, 1948.  F. BARANOWSKI, JR  2,440,535
DOUBLE CONCENTRIC AIR GAP PERMANENT MAGNET INSTRUMENT
Filed June 10, 1947
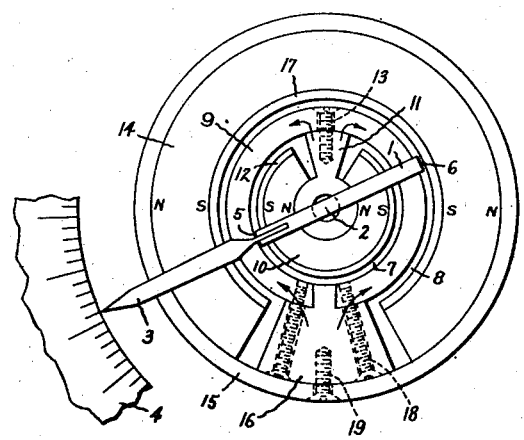
Inventor:
Frank Baranowski, Jr.,
by  Powell S. Mack
His Attorney.

Patented Apr. 27, 1948

2,440,535

UNITED STATES PATENT OFFICE 2,440,535

DOUBLE CONCENTRIC AIR GAP PERMANENT MAGNET INSTRUMENT

Frank Baranowski, Jr., Boston, Mass., assignor to General Electric Company, a corporation of New York Application June 10, 1947, Serial No. 753,611

3 Claims. (Cl. 171—95)

My invention relates to direct current electrical measuring instruments of the permanent magnet field type, and its object is to provide a long scale instrument of this type with exceptionally high sensitivity. In accomplishing this result, I provide the instrument with a pair of concentric air gaps with a moving coil having a coil side in each gap, and inner and outer permanent magnets for producing flux across such gaps.

The features of my invention which are believed to be novel and patentable will be pointed out in the claims appended hereto. For a better understanding of my invention reference is made in the following description to the accompanying drawing in which the single figure represents a plan view of an instrument embodying my invention.

Referring to the drawing, 1 represents the moving coil which is pivoted on the axis of rotation at 2. A pointer 3 is attached to the coil 2 and indicates on a scale 4. The coil sides at 5 and 6 are at unequal distances from the axis of rotation and rotate in inner and outer concentric air gaps 7 and 8. These air gaps are contained in inner and outer permanent magnet field structures of which the split ring 9 of magnetic material is common to both and forms the outer pole piece of the inner field structure containing the air gap 7 and the inner pole piece of the outer field structure containing the air gap 8. The inner field structure includes a C-shaped permanent magnet 10 polarized radially with its inner pole face connected to split ring 9 by a key-shaped part 11 of magnetic material. The outer pole face of the permanent magnet 10 is preferably provided with a pole shoe 12 of suitable magnetic material. The tongue part 11 may be secured to split ring 9 by tap screws as represented at 13. The moving coil 1 may be pivoted at the center of the circular head portion of tongue piece 11 by internal pivots contained in a central bore of such head portion in the manner shown in my copending application Serial No. 720,279, filed January 4, 1947, and assigned to the same assignee as the present invention.

The outer field structure comprises a C-shaped radially magnetized permanent magnet 14 and the outer pole face of which is joined to ring 9 by the circular yoke part 15 and a tongue 16 of magnetic material. The inner pole face of the permanent magnet 14 preferably has a pole shoe 17. The tongue 16 is assembled to the split ring 9 and to yoke 15 by tap screws at 18 and 19.

The parts 9, 11, 15, 16, and 17 are of soft iron or steel of good permeability, and such parts as are directly connected to the permanent magnets may be secured thereto by a cast welding operation.

In assembly of the instrument parts 10, 11 and 12 are assembled as a unit and the coil pivoted thereon as shown. Split ring 9 is then added, short coil side 5 being passed through the gap therein and the split ring fastened in place on part 11 by screws 13. Tongue part 16 is then added and secured in place by screws 18 closing the gap in ring 9. The outer permanent magnet unit consisting of its pole face 17 and yoke 15 is then added and secured in place by screws 19. The tongues of parts 11 and 16 are on opposite sides of the axis of rotation and respectively limit the angle of swing of the short and long sides 5 and 6 of the coil 1. However, since these coil sides are also on opposite sides of the axis of rotation, a deflection range of the order of 300 degrees is available.

In the present instance the permanent magnets are polarized with like poles facing split ring 9. The flux of permanent magnet 10 may be considered to flow from the inner north pole out through tongue 11 into ring 9 and radially inwardly from such ring across gap 7 to the south pole. Hence, the maximum flux density in split ring 9 produced by this inner flux circuit occurs on that side near tongue 11. The flux of permanent magnet 14 flows from the outer north pole through yoke 15 and tongue 16 to ring 9 and across gap 8 to the inner pole face, and hence, the maximum flux density in split ring 9 due to this outer flux circuit occurs on that side near tongue 16.

The two flux paths tend to produce the same flux potential in ring 9. Moreover, the flux in ring 9 from the two flux paths flows in opposite directions therein and hence tends to cancel in the ring. Hence, the flux density in ring 9 tends to be uniform and low in value, so that this ring may be of relatively small, uniform cross section and still be efficiently utilized notwithstanding its double use in the two magnetic circuits. The flux paths referred to above are such as to produce torques of coil 1 in the same direction about the axis of rotation, coil side 6 producing torque in the outer gap 8 and coil side 5 producing torque in the inner gap 7. Hence, these torques add and an instrument of high sensitivity and large deflection range is obtained. Both coil sides are utilized and the torque for the weight of armature is high. With the pointer 3 extending from the short coil side of the armature, the armature weight tends to be balanced about the axis of rotation. The relative dimensions of the two permanent magnets may be different from that represented, and they may be made out of different permanent magnet materials.

For the sake of clarity in illustrating the important features of the invention, conventional parts such as lead-in spirals supporting the frame structure and the like have not been shown.

What I claim as new and desire to secure by Letters Patent of the United States is:

1. An electrical measuring instrument comprising an inner magnetic circuit containing a circular air gap and a permanent magnet for producing a flux across such gap, an outer magnetic circuit containing a second circular air gap and a second permanent magnet for producing a flux across such second air gap, said two circular air gaps being concentric with respect to the same axis and an armature coil pivoted for rotation about said axis, said armature having one coil side in the first-mentioned air gap and the other coil side in the second air gap, said permanent magnets producing fluxes across said gaps in such relative directions as to cause both coil sides to produce torques in the same direction of rotation about such axis when the coil is energized by direct current.

2. An electrical measuring instrument comprising an inner sector-shaped radially polarized permanent magnet, an outer sector-shaped radially polarized permanent magnet, an intermediate ring-shaped part of magnetic material between said magnets and spaced from both of them so as to form inner and outer concentric air gaps, said ring being magnetically connected to the inner pole face of the inner permanent magnet at one point in its periphery and magnetically connected to the outer pole face of the outer permanent magnet at a diametrically opposite point in its periphery, said magnetic connections including radial tongue parts extending through the sector opening in said sector-shaped permanent magnets, said magnets being polarized to produce fluxes across said air gaps in opposite radial directions on any given radius, and a coil pivoted for rotation on an axis at the common center of said concentric air gaps with one coil side in one air gap and the other coil side in the other air gap.

3. An electrical measuring instrument comprising a pair of C-shaped permanent magnets of different size polarized in opposite radial directions said magnets being concentrically assembled one inside of the other with their C-openings facing in opposite directions, a split ring of magnetic material spaced from and between said permanent magnets so as to leave outer and inner concentric air gaps between said ring and the adjacent pole faces of the outer and inner permanent magnets, a tongue part of magnetic material extending radially inward from the split ring at its midpoint through the C-opening in the inner permanent magnet to its inner pole face, a circular magnetic yoke joined to the outer pole face of the outer permanent magnet, a second tongue part of magnetic material extending radially inward from said yoke through the C-opening in the outer permanent magnet to said split ring at the opening therein, and a coil pivoted for rotation on an axis at the common center of said concentric air gaps having one coil side in the inner air gap and the other coil side in the outer air gap, the opening in the split ring being provided for insertion of a coil side therethrough during assembly of the instrument.

FRANK BARANOWSKI, Jr.